United States Patent
Zelkovsky

[19]

[11] Patent Number: 5,856,633
[45] Date of Patent: Jan. 5, 1999

[54] ELECTRICAL RECEPTACLE PROTECTOR

[76] Inventor: Dan Zelkovsky, 321 Old York Rd., Bridgewater, N.J. 08807

[21] Appl. No.: 872,996

[22] Filed: Jun. 11, 1997

[51] Int. Cl.$^6$ .................................................. H05K 5/03
[52] U.S. Cl. .......................... 174/67; 220/242; 439/139
[58] Field of Search .............................. 174/67; 439/139, 439/140; 220/242

[56] References Cited

U.S. PATENT DOCUMENTS

| | | | |
|---|---|---|---|
| 1,697,348 | 1/1929 | Cunningham | 220/242 |
| 2,455,582 | 12/1948 | Hoessel | 174/67 X |
| 2,515,003 | 7/1950 | Hamilton | 174/67 X |
| 2,515,870 | 7/1950 | Hamilton | 174/67 X |
| 2,524,250 | 10/1950 | Bierce | 174/67 X |
| 2,532,219 | 11/1950 | Bierce | 174/67 X |
| 2,641,627 | 6/1953 | Lewis | 174/67 |
| 2,752,581 | 6/1956 | Benender | 174/67 X |
| 3,113,174 | 12/1963 | Spiteri | 174/67 |
| 3,363,216 | 1/1968 | Benedetto | 174/67 X |
| 4,195,290 | 3/1980 | Magil et al. | 174/67 X |
| 4,293,733 | 10/1981 | Royer | 174/67 |
| 4,302,624 | 11/1981 | Newman | 174/67 |
| 4,584,430 | 4/1986 | Belknap | 174/67 |
| 4,895,999 | 1/1990 | Calderon | 174/67 |
| 4,981,439 | 1/1991 | Piedmont | 174/67 X |
| 5,589,665 | 12/1996 | Scamacca | 174/67 |

Primary Examiner—Dean A. Reichard
Attorney, Agent, or Firm—Terrance L. Siemens

[57] ABSTRACT

A protector for an electrical receptacle. A flat housing has a stepped cylindrical bore communicating from the front of the housing to the rear. A cover including a disc bearing slots fits closely yet rotatably into the larger of the two steps. The slots are configured to correspond to, but to be slightly smaller than, openings formed in a receptacle, so that conductive prongs of a plug may be inserted through the cover into the receptacle. The cover is rotated such that its slots align with those of the receptacle when it is desired to connect a plug to power. The cover may be rotated to misalign the respective slots for safety. When the protector is attached to the front of a receptacle, the smaller step of the bore serves as a stop entrapping the cover in the bore, the receptacle blocking escape of the cover at the other end of the bore. The larger step of the bore is long enough to enable the cover to move axially therein. The cover is pulled by frictional engagement with the prongs when the plug is removed from the receptacle, thereby establishing a gap between the cover and the receptacle. Preferably, the protector has two covers, for protecting a duplex receptacle.

12 Claims, 2 Drawing Sheets

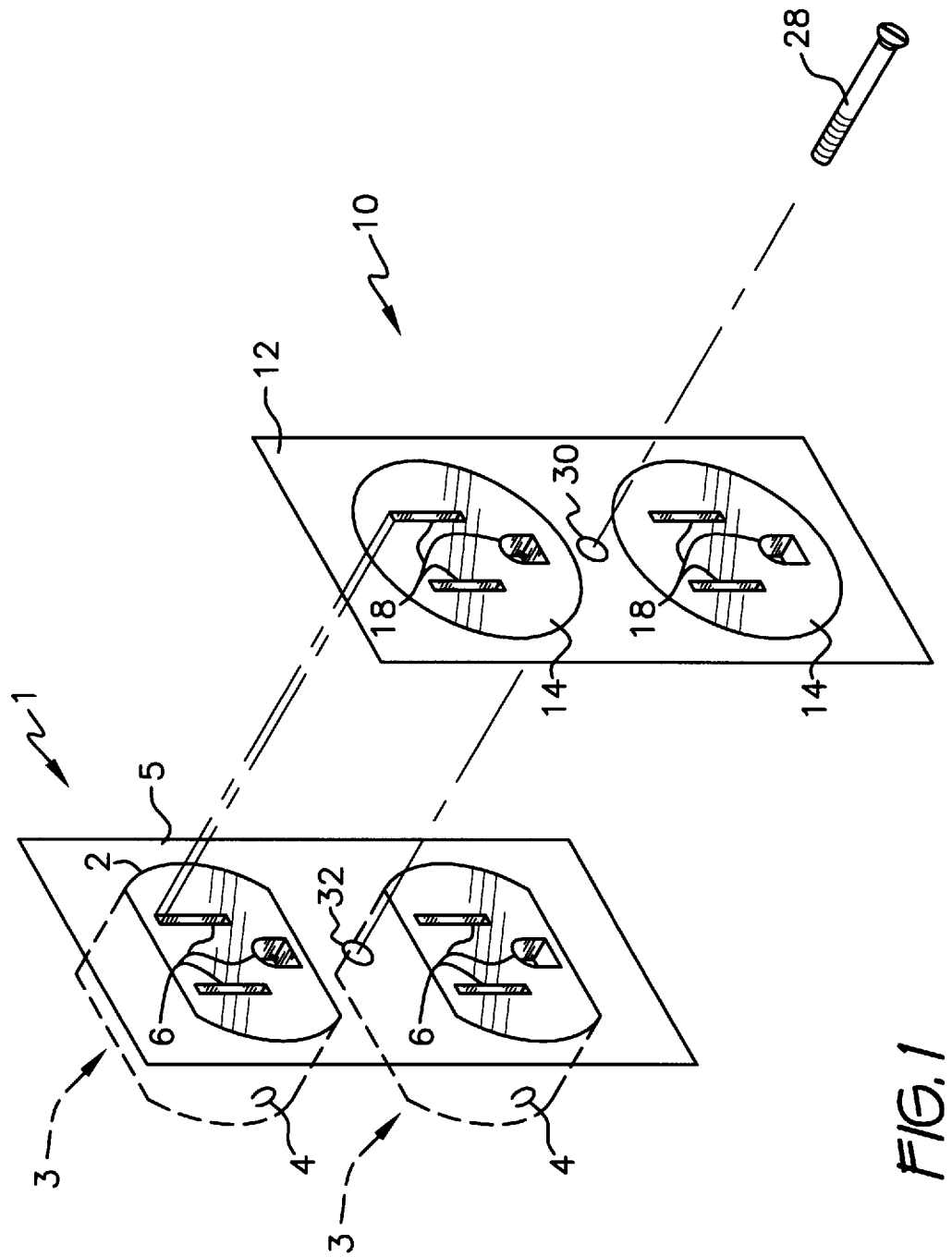

ELECTRICAL RECEPTACLE PROTECTOR

BACKGROUND OF THE INVENTION

1. Field of the Invention

The present invention relates to electrical receptacles of the type for connecting a removable plug to electrical power. More particularly, the invention provides a safety cover for such a receptacle. The safety cover has individual socket covers which are both axially movable and rotatable. When rotated, they deny direct access to energized conductors. When a plug is not inserted into the protected receptacle, the individual socket covers are spaced away from the receptacle and hence from the energized conductors.

2. Description of the Prior Art

Electrical receptacles for enabling ready connection to electrical power provide an enormous convenience for utilizing electrical appliances, lighting apparatus, and the like. Yet the very power made so available is dangerous to the point of being potentially lethal. Despite these conductors being recessed within the receptacle, they are nonetheless directly accessible. A principal source of trouble is small children, whose curiosity may impel them to experiment by inserting their fingers or other objects into a receptacle. Many household objects are conductive, and it therefore becomes desirable to cover the receptacle when not in use.

The prior art has suggested covers for improving safety of electrical receptacles. U.S. Pat. No. 4,302,624, issued to Frederic M. Newman on Nov. 24, 1981, describes a cover having pivotally mounted access doors which pivot into and out of overlying relationship with each receptacle. By contrast, the present invention has rotatable members which have slots corresponding to those of the receptacle. Rotation about a central axis selectively exposes and covers the slots of the receptacle in the present invention. No member in the present invention pivots out of contact with the receptacle. Also, the rotatable members in the present invention move axially when a plug is inserted and withdrawn. No such feature is seen in the invention of Newman.

Hoods projecting axially from the receptacle are shown in U.S. Pat. No. 4,293,733, issued to George T. Royer on Oct. 6, 1981, and U.S. Pat. No. 4,981,439, issued to Gregory H. Piedmont on Jan. 1, 1991. Piedmont provides an interlocking, removable cover which closes an associated hood. Piedmont's cover is not entrapped within the hood or other structure of the receptacle. Also, Piedmont's cover lacks slots for exposing corresponding slots formed in the receptacle. Even further, Piedmont's cover is not axially movable and rotatable in the manner of the present invention. Royer's hooded protector lacks any cover closing access to the protected receptacle, unlike the present invention.

Protective covers which close over a plug being inserted into the protected receptacle or over its cord are depicted in U.S. Pat. No. 3,363,216, issued to Patrick J. Benedetto on Jan. 9, 1968, U.S. Pat. No. 4,895,999, issued to Bill R. Calderon on Jan. 23, 1990, and U.S. Pat. No. 5,589,665, issued to Randal Scamacca on Dec. 31, 1996. These inventions lack covers rotatably mounted to the receptacle, which covers can both rotate and move axially with respect to the receptacle. By contrast, covers which are both rotatable and axially movable relative to the receptacle and which are permanently mounted to the receptacle are found in the present invention.

None of the above inventions and patents, taken either singly or in combination, is seen to describe the instant invention as claimed.

SUMMARY OF THE INVENTION

The present invention provides an uncomplicated safety protector which protects receptacles having recessed energized conductors. The safety protector includes one rotatable cover for each receptacle. The cover moves in two different ways. Each way provides one element of protection.

Each cover comprises a circular disc having slots dimensioned and located to correspond to those of the receptacle. The cover is rotatably and axially movably mounted within a housing which covers the receptacle. In duplex receptacles, there is one housing supporting two covers. The cover may be rotated such that its slots align with those of the receptacle. With the cover in this position, a plug may be inserted into the receptacle. When the plug is removed from the receptacle, the cover may be rotated so that no direct line of access or sight exists from the outside of the protector to the recessed energized conductors. This feature is the first element of protection.

The cover is axially movable within the housing. Normally, the cover sits spaced apart from the receptacle. When a plug is inserted, it first pushes the cover towards the receptacle and pins it in this location. When removed, the prongs of the plug frictionally engage the rotatable cover, pulling it away from the receptacle. After a short distance of travel, the rotatable cover encounters a stop, and the plug can be pulled free of the protector. However, the rotatable cover has been pulled to its spaced apart location relative to the receptacle. Space separating the cover from the receptacle increases likelihood that small household objects inserted through the cover will not reach exposed conductors. For example, nails and hair pins, even though inserted through the slots, may not have sufficient exposed length to reach into the slots of the receptacle. This space thus provides the second element of protection.

The novel protector thus provides two elements of protection with minimal complication of structure. The uncomplicated structure thus eliminates time and effort of assembly, reduces costs, and provides little structure which may engage the interest of a child. There is little in the construction of the improved receptacle to indicate to a small child how the protected conductors may be exposed. No fasteners or small parts which may become lost or damaged are required. No tools are required to assemble or utilize the invention once in place.

Slots and openings formed in each rotatable cover for receiving prongs of a plug are reduced in size from those of the receptacle, so that the rotatable cover may frictionally engage the plug and be retracted away from the receptacle when the plug is withdrawn. This feature excludes larger objects which a child might be tempted to insert into the receptacle. The slots are also less conspicuous, so as to reduce likelihood of intriguing the child.

Reduced size of openings and spacing of the cover fro the receptacle decrease likelihood that a conductive substance can cause a short circuit or a ground fault. For example, if a beverage or other liquid is spilled in the vicinity of a receptacle protected according to the present invention, the liquid must negotiate a more complicated path to contact energized conductors. Conductive dust, such as may be present in machine shops, welding facilities, and the like, will also present reduced chance of hazard. This holds true even if the rotatable covers have been left in a position exposing the conductors.

The covers and their housing may be formed from an elastic material, so that requirements for precision of tolerances are minimal. The invention is easily fabricated from a suitable synthetic resin, which construction is inexpensive and also provides a barrier of electrical insulating material between energized conductors and the exterior of the receptacle.

Accordingly, it is a principal object of the invention to provide a protector for covering an electrical receptacle having energized conductors.

It is another object of the invention that the protector reduce direct access to energized conductors.

It is a further object of the invention to that the protector not have removable components.

Still another object of the invention is that the protector also cause a barrier to be spaced apart from the energized conductors.

An additional object of the invention is that the protector have a member rotatable into a position exposing energized conductors.

It is again an object of the invention that the rotatable member be movable by virtue of engagement with a plug being inserted into the receptacle.

Yet another object of the invention is to maximally complicate a direct path to energized conductors.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic, exploded, front perspective view of the invention.

DETAILED DESCRIPTION OF THE PREFERRED EMBODIMENTS

Figure 3:
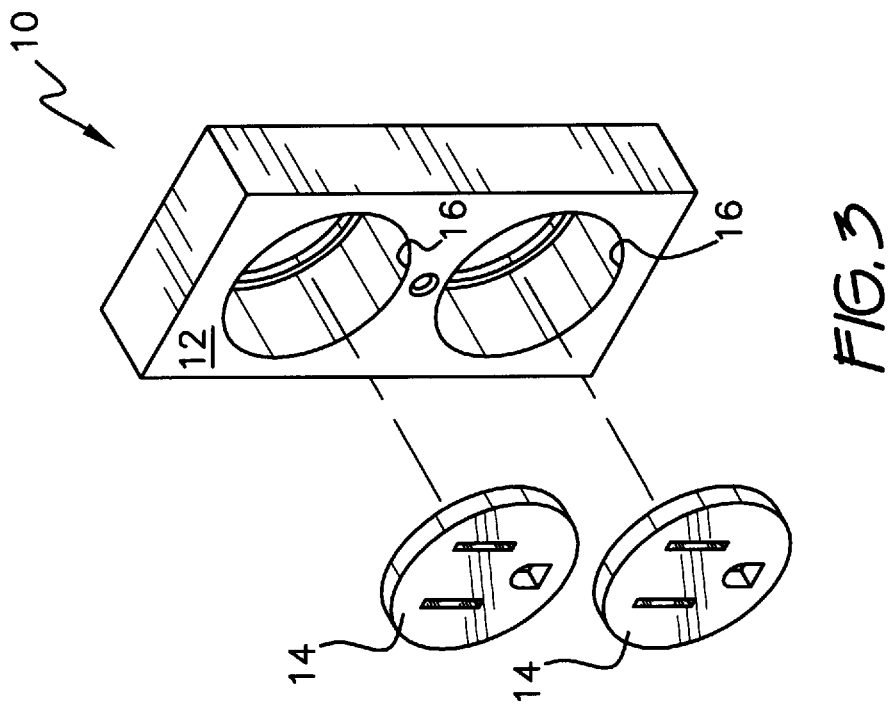
FIG. 3 is an exploded rear perspective view of FIG. 2.

Turning now to FIG. 1 of the drawings, there is shown an electrical receptacle 1 which is protected according to the present invention against direct access to exposed energized conductors. Electrical receptacle 1 is fairly conventional and will not be set forth in full detail. Receptacle 1 may be briefly described as having two receptacle bodies 2 fabricated from insulating material and mounted on a common frame (not shown), electrical conductors 3 for making contact with the prongs of an electrical plug of a plug and cord assembly (not shown), connection terminals 4 for attaching conductors of external wiring (not shown), and a cover plate 5 for covering gaps which may exist between receptacle body 2 and an environmental surface (not shown) to which receptacle 1 is mounted. Electrical conductors 3 are accessible from the front of receptacle 1 through openings 6. Portions of conductors 3 are exposed at openings 6, for enabling contact with the plug when the prongs of the plug are inserted into openings 6. As depicted, openings 6 include two openings leading to power conductors and one opening leading to a grounded conductor, as is well known for safety reasons.

Receptacle 1, as depicted, is a duplex receptacle of a type frequently employed in the United States and throughout the industrialized world for enabling ready connection of plugs of power cords. However, the invention will generally apply to receptacles having more bodies 2 or only one receptacle body 2. The number of conductors and associated openings may vary from the example shown. A receptacle protected according to the present invention may be of configuration and electrical characteristics other than those associated with common duplex receptacles. Also, it will be understood that all references to conduction and insulation refer to flow of electrical current, rather than to heat transfer or any other phenomenon.

Receptacle 1 is protected by protector 10. Protector 10 has a housing 12 for mounting over receptacle 1 and for supporting two protective covers 14 each obstructing unimpeded access to receptacle 1. Each protective cover 14 is slidably supported within a bore or channel 16 formed in housing 12 in a manner such that each cover 14 is disposed in axial alignment with its associated receptacle body 2 of receptacle 1. Channel 16 of housing 12 constrains linear displacement of each cover 14 to be only axial, with respect to its associated receptacle body 2. Axial alignment further signifies that each cover 14 is disposed so that openings 18 formed in each body 12 may be aligned in overlying relation with openings 6 of associated receptacle body 2.

Displacement signifies that a cover 14 moves so as to change its distance of separation from any other component of receptacle 1. By contrast, cover 14 can be moved by rotation within channel 16 without changing distance of separation from a component of receptacle 1. Rotation can be a full three hundred sixty degrees about an axis (not shown) extending from the front of receptacle 1 to the rear thereof. IN the embodiment depicted, both cover 14 and channel 16 are circular in cross section, thereby enabling full rotation of cover 14. This configuration is preferred for reasons relating to reduced cost of fabrication.

Alternatively, channel 16 may be arranged to stop rotation before full rotation is attained. The actual degree of rotation enabled by protector 10 is enough so that each cover 14 can be rotated between a first position wherein openings 18 align with the prong connection openings 6 of the receptacle, and a second position wherein openings 18 are not aligned with prong connection openings 6 of the receptacle.

Figure 2:
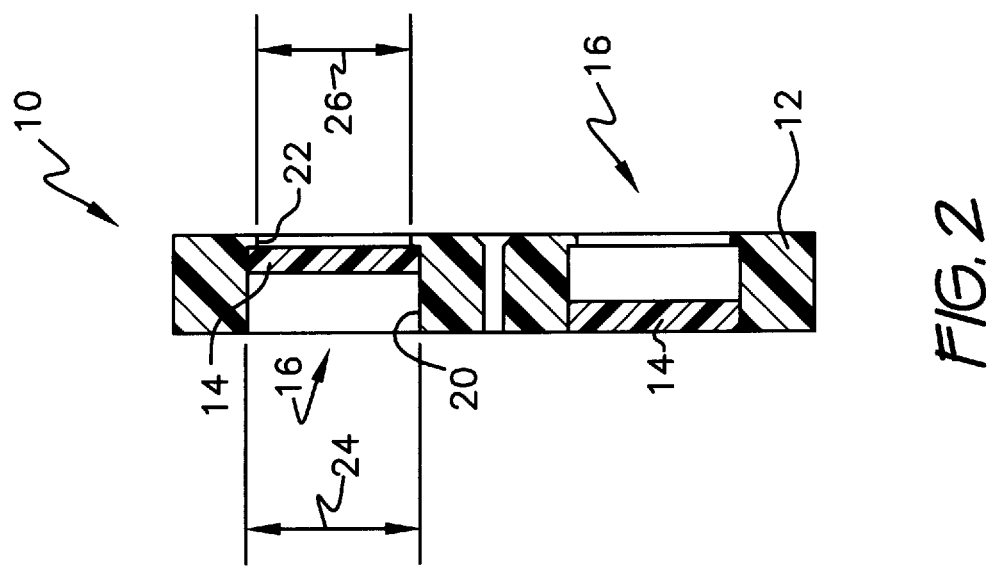
FIG. 2 is a side cross sectional view taken along line 2—2 of FIG. 1.

Details of channel 16 are shown in FIGS. 2 and 3. FIG. 2 shows that each channel 16 has a stepped bore having two steps 20, 22. Step 20 has a diameter 24 equal in magnitude to that of cover 14, so that cover 14 may be inserted into and occupy channel 16. Step 22 has a diameter 26 of magnitude smaller than that of diameter 24, thereby forming a stop preventing cover 14 from escaping from housing 12 from one side of channel 16. When protector 10 is fixed to receptacle 1, as may be accomplished by threading screw 28 (see FIG. 1) through bores 30, 32 (respectively) of housing 12 and plate 5, receptacle 1 prevents escape of cover 14 from the other side of channel 16. This feature enables only two steps to be adequate in retaining cover 14 within housing 12. Of course, if desired, a third step of diameter reduced from that of step 20 may be provided to entrap cover 14 at all times.

Protector 10 may be formed to include any desired number of covers, depending upon configuration of a receptacle being protected. Although most receptacles in commercial and residential use are duplex, as illustrated in FIG. 1, any number of receptacles arrayed in various ways may be provided protection according to the invention.

The present invention may be practiced in several ways. Illustratively, novel protector 10 may be retrofitted to an existing receptacle provided with a cover plate by mounting protector 10 in front of the cover plate. Alternatively, the novel protector 10 may itself be dimensioned and configured to replace the cover plate.

It is to be understood that the present invention is not limited to the embodiments described above, but encompasses any and all embodiments within the scope of the following claims.

I claim:

1. A protector for an electrical receptacle for providing ready connection of a plug having prongs to electrical power, the receptacle having energized conductors exposed at the front thereof through prong connection openings, said protector comprising:

a cover for obstructing unimpeded access to the receptacle, said cover having openings formed therein for enabling penetration of prongs of the plug through said cover into the receptacle; and a housing for mounting over the receptacle, said housing having a channel formed therein supporting said cover in axial alignment with the receptacle, said cover axially movable within said housing so as to be selectively spaced apart from the receptacle and pushed toward the receptacle, said housing constraining linear displacement of said cover to be only axial with respect to the receptacle.

2. The protector according to claim 1, said channel dimensioned and configured to enable at least partial rotation of said cover between a first position wherein said openings of said cover align with the prong connection openings of the receptacle, and a second position wherein said openings of said cover are not aligned with the prong connection openings of the receptacle.

3. The protector according to claim 2, said channel being circular and said cover being circular, thereby enabling three hundred and sixty degrees of rotation of said cover within said channel.

4. The protector according to claim 1, said cover having a cover diameter, and said channel comprising a stepped bore having two and only two steps including a first step having a first diameter and a second step having a second diameter, said first diameter being of magnitude equal to that of said cover diameter, whereby said cover occupies said first step of said stepped bore of said channel, said second diameter being of magnitude smaller than that of said first diameter, whereby said second step forms a stop preventing said cover from escaping from said housing from one side of said channel.

5. The protector according to claim 1, further comprising a second cover for obstructing unimpeded access to a second receptacle, said second cover having openings formed therein for enabling penetration of prongs of the plug which is to be connected to power through said second cover into the second receptacle, said housing having a second channel formed therein supporting said second cover in axial alignment with the second receptacle and constraining linear displacement of said second cover to be only axial with respect to the second receptacle, whereby said protector operably serves a duplex receptacle.

6. A protector for an electrical receptacle for providing ready connection of a plug having prongs to electrical power, the receptacle having energized conductors exposed at the front thereof through prong connection openings, said protector comprising:

at least two covers for obstructing unimpeded access to the receptacle, each said cover having openings formed therein for enabling penetration of prongs of the plug through said cover into the receptacle; and a housing for mounting over the receptacle, said housing having one channel formed therein supporting each said cover in axial alignment with openings exposing conductors of the receptacle. each said cover axially movable within said housing so as to be selectively spaced apart from the receptacle and pushed toward the receptacle, said housing constraining linear displacement of each said cover to be only axial with respect to the receptacle, each said channel dimensioned and configured to enable at least partial rotation of its associated said cover between a first position wherein said openings of its associated said cover align with the prong connection openings of the receptacle, and a second position wherein said openings of its associated said cover are not aligned with the prong connection openings of the receptacle, each said cover having a cover diameter, and each said channel comprising a stepped bore having two and only two steps including a first step having a first diameter and a second step having a second diameter, said first diameter being of magnitude equal to that of said cover diameter, whereby each said cover occupies said first step of said stepped bore of said channel, said second diameter being of magnitude smaller than that of said first diameter, whereby said second step forms a stop preventing each said cover from escaping from said housing from one side of said channel.

7. The protector according to claim 6, each said channel being circular and each said cover being circular, thereby enabling three hundred and sixty degrees of rotation of each said cover within its respective said channel.

8. An electrical receptacle protected against direct access to exposed energized conductors, comprising:

a receptacle having a receptacle body fabricated from insulating material, said receptacle body having openings for receiving prongs of an electrical plug which is to be inserted into said receptacle for connection to electrical power, electrical conductors disposed within said receptacle body, said electrical conductors having exposed portions disposed within said openings of said receptacle body, and connection terminals for attachment of conductors of wiring; and a protector for protecting said receptacle by selectively preventing direct access to said electrical conductors, said protector comprising a cover for obstructing unimpeded access to said receptacle body, said cover having openings formed therein for enabling penetration of prongs of the plug to be inserted into said receptacle for connection to electrical power through said cover into said openings for receiving prongs of the plug of said receptacle body, and a housing for mounting over said receptacle body, said housing having a channel formed therein supporting said cover in axial alignment with said receptacle body, said cover axially movable within said housing so as to be selectively spaced apart from the receptacle and pushed toward the receptacle, said housing constraining linear displacement of said cover to be only axial with respect to said receptacle body.

9. The electrical receptacle according to claim 8, said channel dimensioned and configured to enable at least partial rotation of said cover between a first position wherein said openings of said cover align with the openings of the receptacle for receiving prongs, and a second position wherein said openings of said cover are not aligned with the openings of the receptacle for receiving prongs.

10. The electrical receptacle according to claim 9, said channel being circular and said cover being circular, thereby enabling three hundred and sixty degrees of rotation of said cover within said channel.

11. The electrical receptacle according to claim 8, said cover having a cover diameter, and said channel comprising a stepped bore having two and only two steps including a first step having a first diameter and a second step having a second diameter, said first diameter being of magnitude equal to that of said cover diameter, whereby said cover occupies said first step of said stepped bore of said channel, said second diameter being of magnitude smaller than that of said first diameter, whereby said second step forms a stop preventing said cover from escaping from said housing from one side of said channel.

12. The electrical receptacle according to claim 8, said electrical receptacle being a duplex receptacle, said protector further comprising a second cover for obstructing unimpeded access to a second receptacle, said second cover having openings formed therein for enabling penetration of prongs of the electrical plug which is to be inserted into said receptacle for connection to electrical power through said second cover into the second receptacle, said housing having a second channel formed therein supporting said second cover in axial alignment with the second receptacle and constraining linear displacement of said second cover to be only axial with respect to the second receptacle.

* * * * *